US00RE37648E

(19) United States
(12) Reissued Patent
Fulks

(10) Patent Number: US RE37,648 E
(45) Date of Reissued Patent: Apr. 9, 2002

(54) COMPACT WEIGHT LIFTING MACHINE

(76) Inventor: Kent Fulks, 9710 Amberly Dr., Dallas, TX (US) 75243

( * ) Notice: This patent is subject to a terminal disclaimer.

(21) Appl. No.: 09/134,167

(22) Filed: Aug. 13, 1998

Related U.S. Patent Documents

Reissue of:
(64) Patent No.: 5,549,530
Issued: Aug. 27, 1996
Appl. No.: 08/429,315
Filed: Apr. 26, 1995

U.S. Applications:

(63) Continuation-in-part of application No. 08/034,734, filed on Mar. 19, 1993, now Pat. No. 5,447,480.

(51) Int. Cl.[7] ..... A63B 21/06
(52) U.S. Cl. ..... 482/100; 482/138; 482/142
(58) Field of Search ..... 482/97, 100, 133, 482/136–138, 142

(56) References Cited

U.S. PATENT DOCUMENTS 4,623,144 A * 11/1986 Rockwell
4,744,559 A * 5/1988 Mahnke et al.
4,746,115 A * 5/1988 Lahman
4,809,972 A * 3/1989 Rasmussen et al.
4,854,578 A * 8/1989 Fulks ..... 482/97
4,898,381 A * 2/1990 Gordon
4,902,006 A * 2/1990 Stallings
4,915,377 A * 4/1990 Malnke
4,930,768 A * 6/1990 Lapcevic
4,964,632 A * 10/1990 Rockwell
4,982,955 A * 1/1991 Heasley
4,982,956 A * 1/1991 Lapcevic
4,986,538 A * 1/1991 Ish, III
4,988,095 A * 1/1991 Ferrari
5,417,633 A * 5/1995 Habing

FOREIGN PATENT DOCUMENTS

WO PCT/NO92/00129 * 3/1993

* cited by examiner

*Primary Examiner*—John Mulcahy
(74) *Attorney, Agent, or Firm*—John F. Bryan

(57) ABSTRACT

A compact weight lifting machine includes a lift bar assembly including a lift cable and a lift bar which operates through the lift cable to lift selected weights from a weight stack responsive to either upward or downward movement of the lift bar. A seat assembly is positioned beneath the lift bar and includes first and second sections selectively positionable to support a user to perform a variety of exercises. A leg extension/leg curl mechanism located at one end of the seat assembly and a butterfly mechanism located at the opposite end of the seat assembly also operate through the lift cable to lift selected weights from the weight stack.

6 Claims, 10 Drawing Sheets

COMPACT WEIGHT LIFTING MACHINE

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part of prior application Ser. No. 08/034,734, filed Mar. 19, 1993, now U.S. Pat. No. 5,447,480.

BACKGROUND OF THE INVENTION

With the advent of the physical fitness boom, weight lifting machines of all shapes and sizes appeared on the market. Unfortunately, each machine typically provides for a very limited range of exercises, requiring several machines to accomplish a full workout.

Various means of resistance have been employed in the many different types of prior art weight lifting machines. Hydraulic and pneumatic resistance, as well as cable supported lead weight resistance have been employed, with the traditional lead weight resistance machines exhibiting greater durability. In lead weight-type machines the weight stack is usually suspended from a cable and structure is provided for incrementally adjusting the amount of weight being lifted. Typically, the cable is configured over a series of pulleys for extension and retraction in a single direction. Therefore, movement of the weight lifting bar or lever connected to the opposite end of the lift cable is restricted to a particular range or direction of movement, thereby requiring several different machines to complete a full body workout.

SUMMARY OF THE INVENTION

The compact weight lifting machine of the present invention overcomes the foregoing limitations and restrictions by providing a lift bar pivotally mounted on a frame and adjustably mounted for upward or downward movement. The lift bar is operably connected to a pivot arm mounted for pivotal movement between parallel upper and lower pulley supporting arms having pulleys mounted thereon to define the path of a lift cable. Restraining members allow movement of one arm at a time, but are anchored to limit pivotal movement toward the other arm, resulting in bidirectional activation of the lift cable by the lift bar.

The lift cable extends beyond the pulleys for actuation by additional lift members. A fully adjustable seat assembly is positioned under the lift bar, and the lift cable extends under the seat assembly. A leg actuated lift member is located at one end of the seat assembly and is adjustably positionable for sitting or reclining actuation. A butterfly lift member is located at the opposite end of the seat assembly.

BRIEF DESCRIPTION OF THE DRAWINGS

A more complete understanding of the present invention may be had by reference to the following Detailed Description taken in conjunction with the accompanying Drawings, in which.

DETAILED DESCRIPTION

Figure 1:
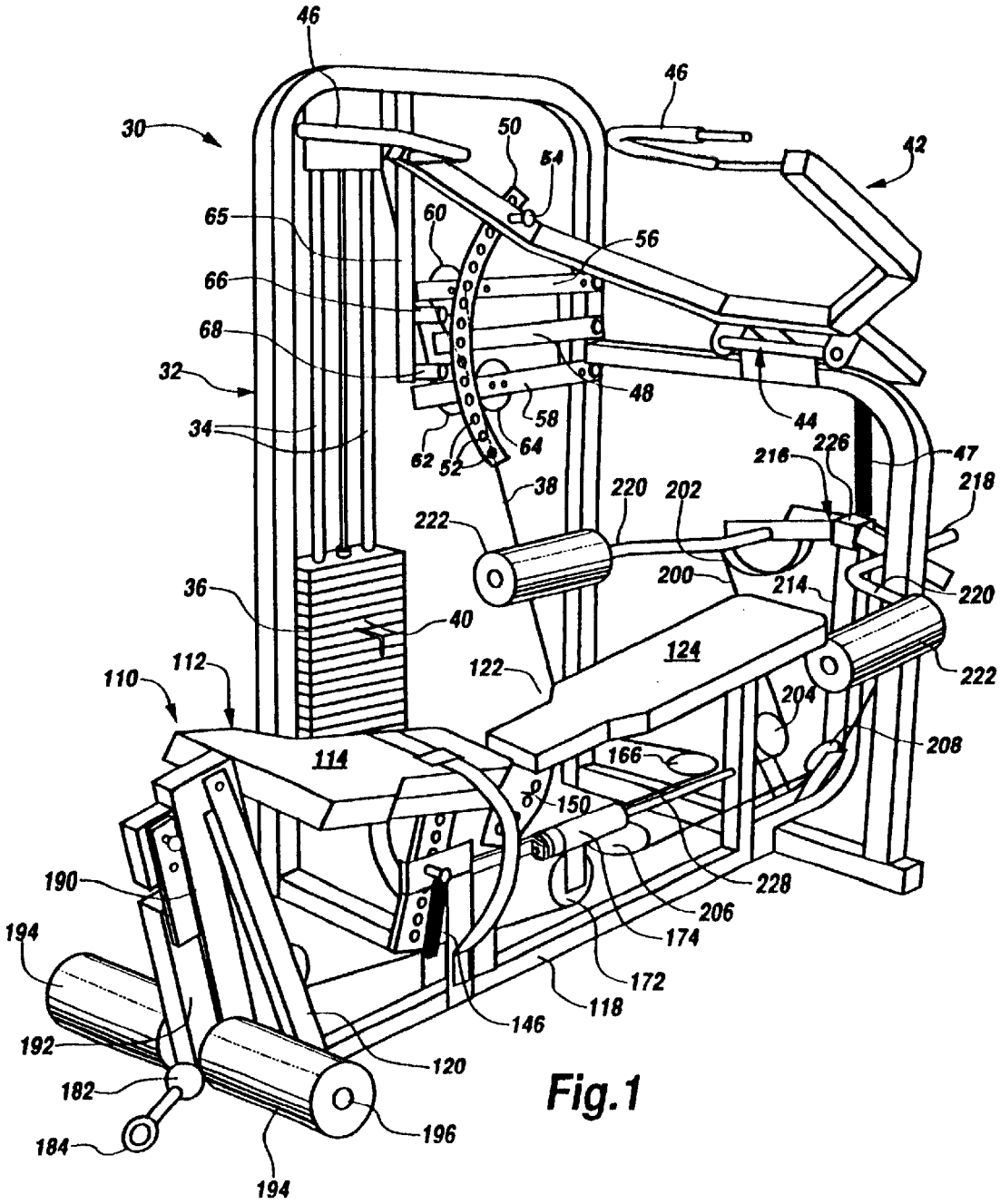
FIG. 1 is a perspective view of a compact weight lifting machine incorporating the present invention.
Figure 2:
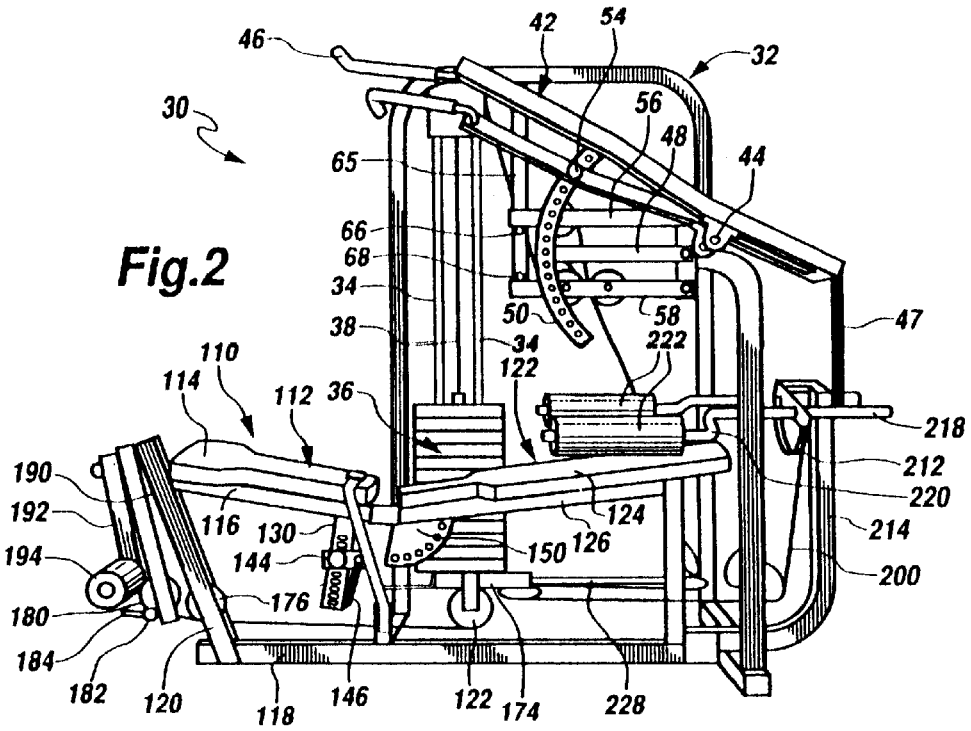
FIG. 2 is a front view of the weight lifting machine of FIG. 1.
Figure 3:
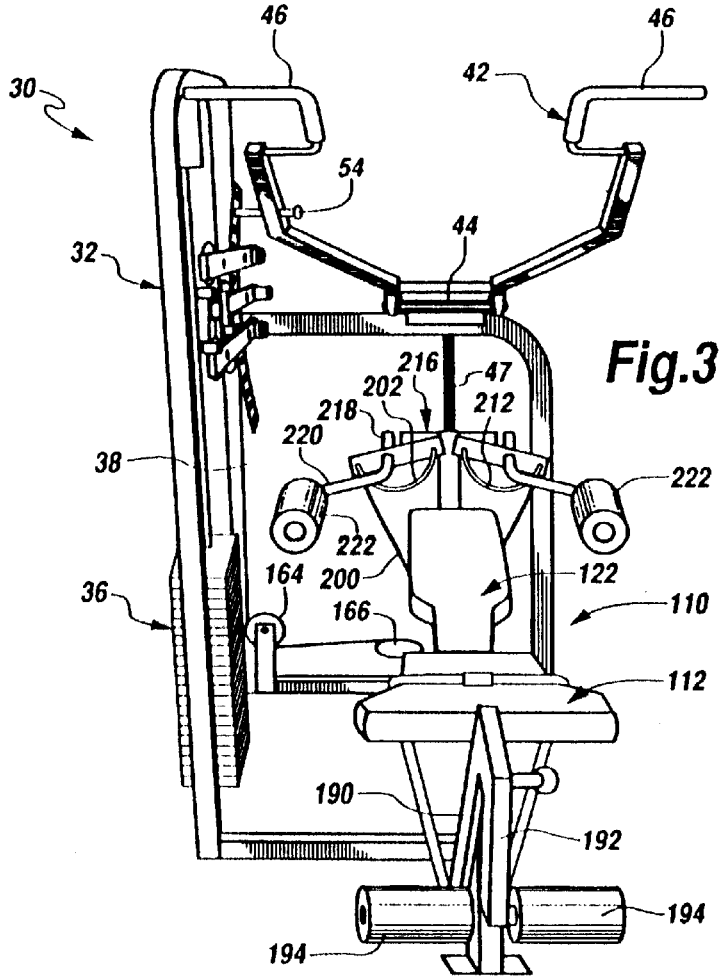
FIG. 3 is an end view of the weight lifting machine of FIG. 1.

Referring now to the Drawings, and particularly to FIGS. 1, 2 and 3 thereof, there is shown a compact weight lifting machine 30 incorporating the present invention. The machine 30 comprises a frame 32 which supports and positions the various component parts thereof. The frame 32 is conventional in nature and comprises a plurality of interconnected sections of tubing. The tubing sections comprising the frame 32 may be formed from stainless steel or other conventional materials, and may have a square, rectangular, or any other desired cross sectional configuration. The tubing sections comprising the frame 32 are preferably cut, bent, and welded or otherwise secured together using conventional techniques.

The frame 32 includes a pair of vertically extending guides 34. A conventional weight stack 36 comprises a plurality of individual weights which may be formed from cast iron and which are slidably supported on the guides 34 for vertical movement thereon against the action of gravity. A lift cable 38 extends between the guides 34 and is selectively connected to the individual weights comprising the weight stack 36 by means of a pin 40 which is selectively connected to the lift cable 38 in the conventional manner.

Figure 4:
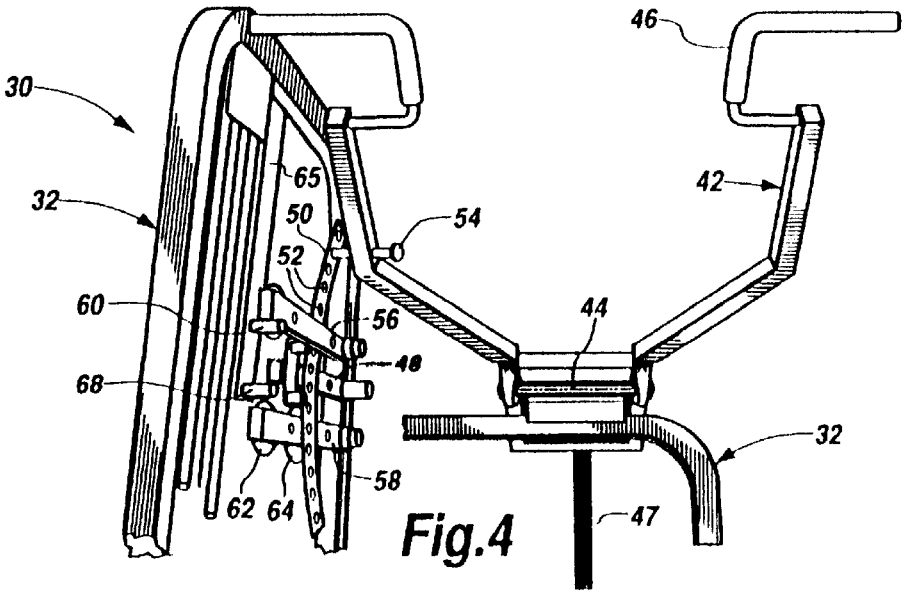
FIG. 4 is an illustration of certain components of the weight lifting machine of FIG. 1.
Figure 5:
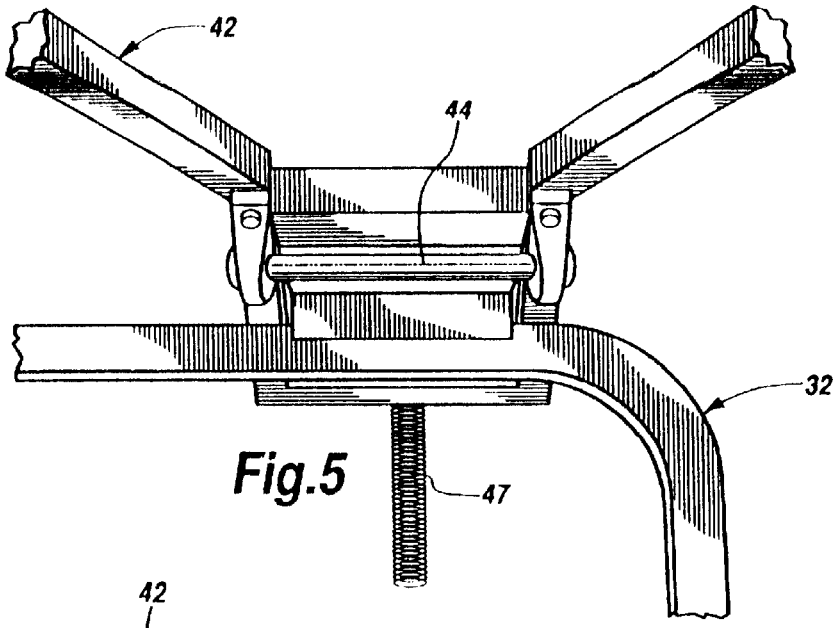
FIG. 5 is an enlargement of a portion of FIG. 4.
Figure 6:
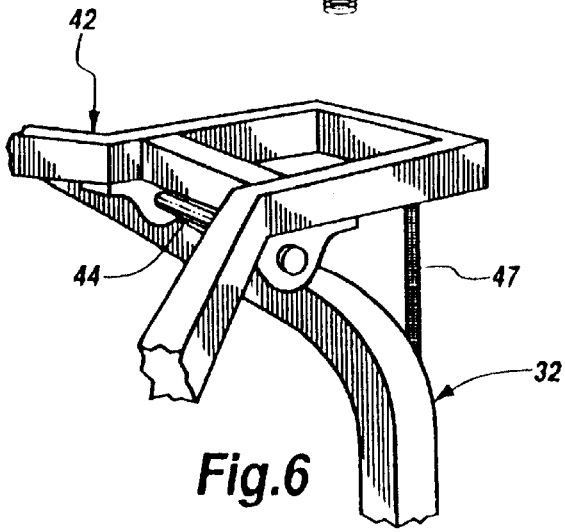
FIG. 6 is a perspective view of the mechanism shown in FIG. 6.

Referring to FIGS. 1–6, a lift bar assembly, which includes a lift bar 42, is supported on the frame 32 for upward and downward pivotal movement about a horizontal axis defined by a rod 44. The lift bar 42 extends from the rod 44 to a pair of handles 46 each comprising a plurality of angularly disposed sections which are connected end to end to one another. As is best shown in FIGS. 4, 5, and 6, a spring 47 counterbalances the weight of the lift bar 42. As used herein, the term "lift" refers to the lifting of selected weights from the weight stack in response, for example, to movement of the lift bar in either direction.

Referring to FIGS. 1, 2, and 4, a pivot arm 48 is supported on and is pivotally connected to the frame 32 at one end thereof. An arcuate member 50 is connected to the distal end of the pivot arm 48. The arcuate member 50 has a plurality of pin receiving holes 52 formed therein at equally spaced locations along its length. The lift bar 42 is selectively connected to the arcuate member 50 by means of a pin 54 which is received in a selected hole 52. By means of the pin 54 and the holes 52 of the arcuate member 50, the lift member 42 is selectively positioned angularly with respect to the pivot arm 48 and the remaining components of the compact weight lifting machine 30.

Continuing to refer to FIGS. 1, 2 and 4, the compact weight lifting machine 30 further comprises an upper pulley supporting arm 56 and a lower pulley supporting arm 58. The arms 56 and 58 are each supported by and pivotally connected to the frame 32. The arm 56 has a pulley 60 rotatably supported at the distal end thereof, and the arm 58 has a pair of pulleys 62 and 64 rotatably mounted thereon.

The frame 32 of the compact weight lifting machine 30 includes a vertically disposed portion 65 which supports a pair of stops 66 and 68. The stop 66 normally engages the arm 56 and prevents pivotal movement thereof downwardly from the position shown in FIG. 1. The stop 68 normally engages the arm 58 and prevents upward movement thereon from the position shown in FIG. 1.

Figure 7:
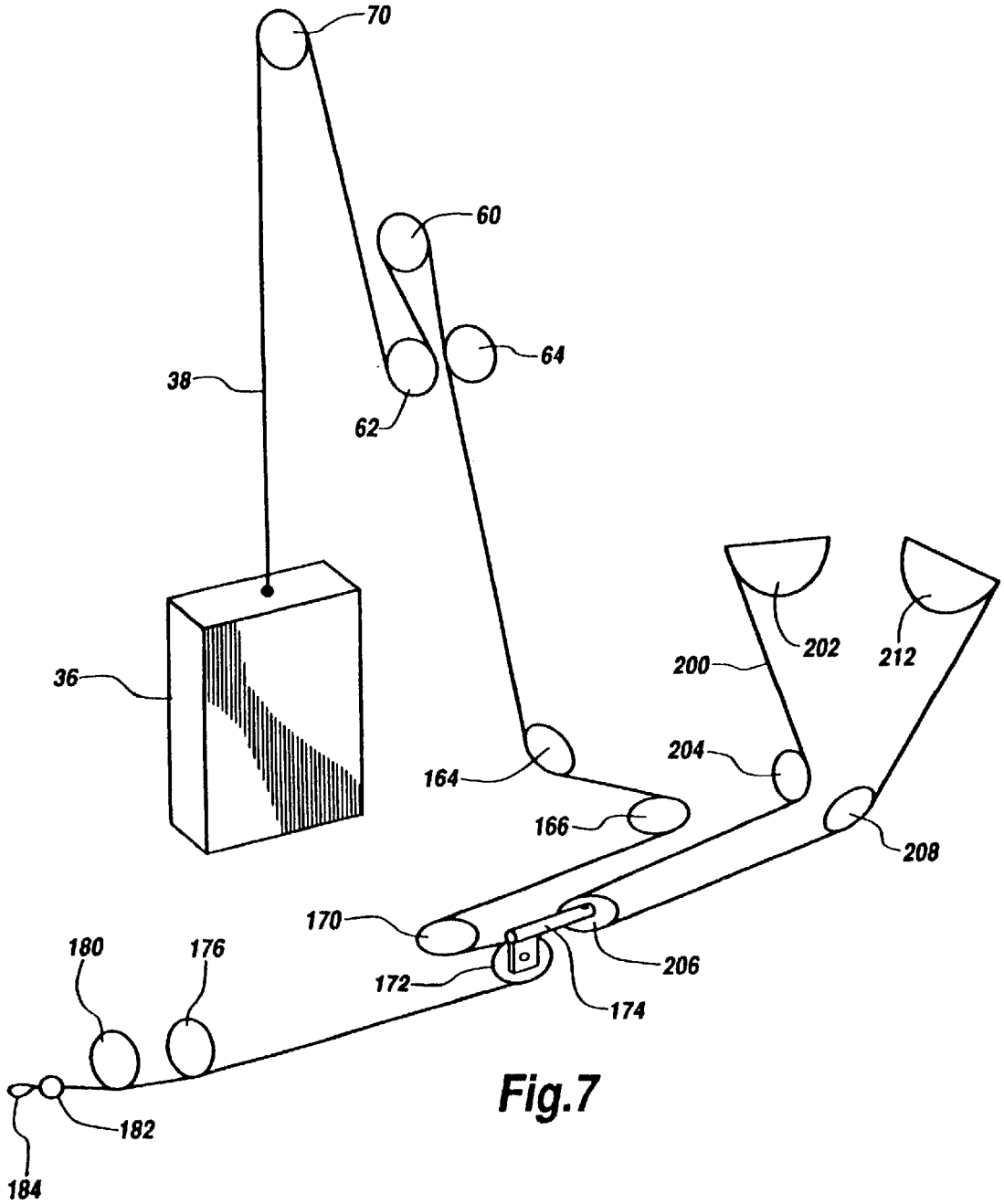
FIG. 7 is a diagrammatic illustration of the lift cable system of the weight lifting machine of FIG. 1.

Referring now to FIGS. 1 and 7, the lift cable 38 extends upwardly from the weight stack 36 and is trained around pulley 70 which is rotatably supported on the frame 32. From the pulley 70 the lift cable 38 extends downwardly and is trained around the pulley 62 rotatably mounted on the lower pulley supporting arm 58. From the pulley 62 the cable 38 extends upwardly and is trained around the pulley 60 rotatably mounted on the upper pulley supporting arm 56. The cable 38 then extends downwardly and engages the pulley 64 which is rotatably mounted on the arm 58.

It will therefore be understood that upon upward pivotal movement of the lift bar 42 from the position shown in FIG. 1, the lift bar 42 operates through the arcuate member 50 and the pivot arm 48 to raise the pulley supporting arm 56 while the stop 68 prevents upward pivotal movement of the pulley supporting arm 58. This action increases the distance between the pulley 60 rotatably supported on the arm 56 and the pulley 62 rotatably supported on the arm 58, whereby the lift cable 38 functions to raise selected weights comprising the weight stack 36 against the action of gravity. Conversely, upon downward movement the lift bar 42 operates through the arcuate member 50 and the pivot arm 48 to pivot the arm 58 downwardly while the arm 56 is restrained from downward pivotal movement by the stop 66. This action likewise increases the distance between the pulleys 60 and 62, thereby causing the lift cable 38 to raise selected weights comprising the weight stack 36.

It will therefore be understood that the lift bar mechanism of the compact weight lifting machine 30 of the present invention is substantially identical in construction and function to the lift bar mechanism disclosed and claimed in application Ser. No. 08/034,734, filed Mar. 19, 1993, now U.S. Pat. No. 5,447,480, the disclosure of which is incorporated herein by reference as if fully set forth herein.

Figure 8:
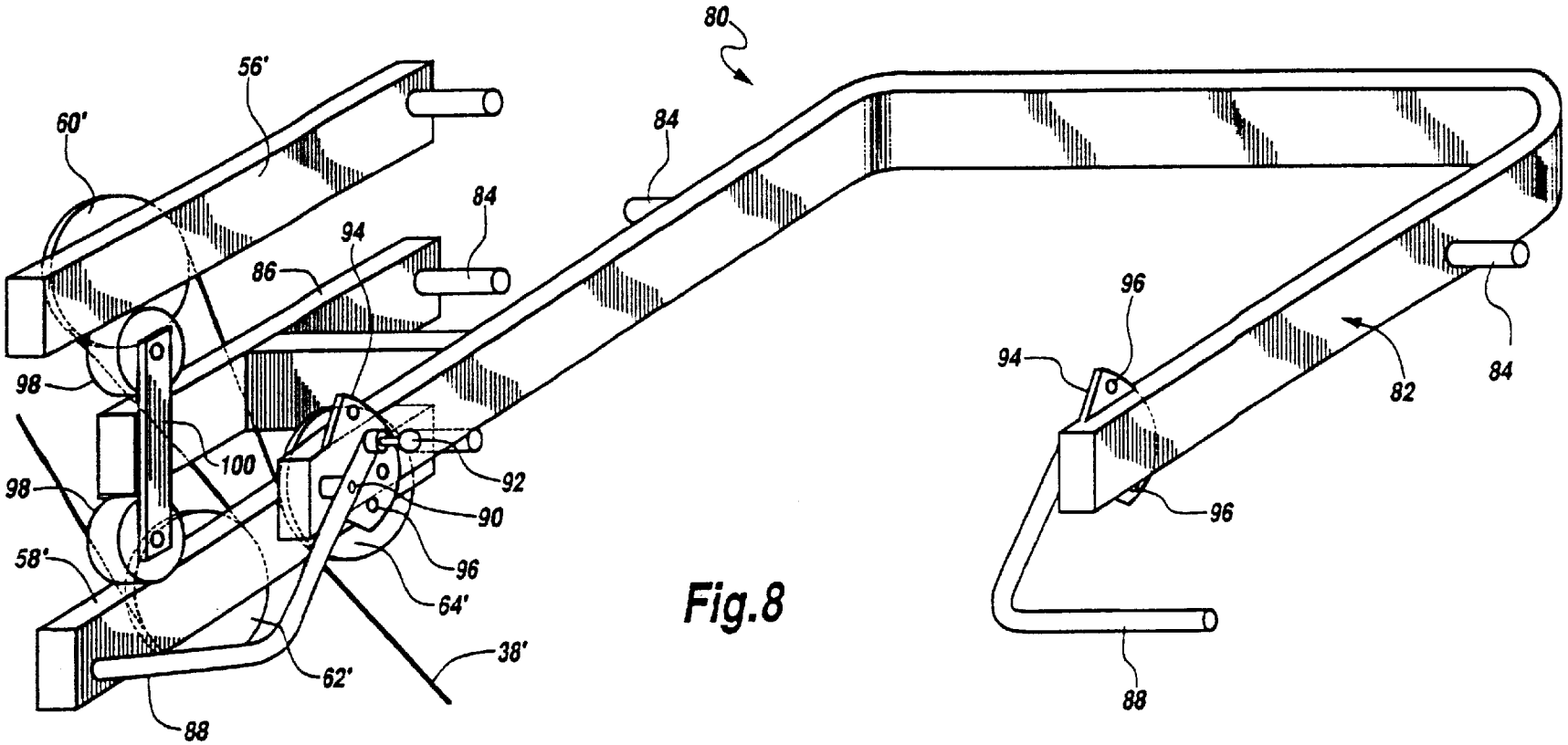
FIG. 8 is an illustration of a second embodiment of the lift bar assembly of the weight lifting machine of FIG. 1.

Referring now to FIG. 8, there is shown a lift bar assembly 80 comprising an alternative embodiment which may be used in the practice of the present invention in lieu of the lift bar assembly shown in FIG. 1. The lift bar assembly 80 comprises a lift bar 82 which is supported for upward and downward pivotal movement about a horizontal axis defined by a pair of rods 84. A pivot arm 86 is secured to the lift bar 82 for pivotal movement therewith about the same horizontal axis.

The lift bar mechanism 80 further comprises a pair of handles 88 which are pivotally supported on the lift bar 82 by pins 90. Each handle 88 has a locking pin 92 mounted thereon. Arcuate members 94 are mounted on the lift bar 82 and are provided with a plurality of evenly spaced pin receiving holes 96. In use, the locking pins 92 are received in the locking holes 96 to selectively position the handles 88 relative to the lift bar 82 and the pivot arm 86.

A lift cable 38' is trained around pulleys 62', 60', and 64' in a manner identical to that illustrated in FIG. 7. The pulley 60' is rotatably supported on a pulley support arm 56', and the pulleys 62' and 64' are rotatably supported on a pulley support arm 58'. The lift cable 38', the pulleys 60', 62', and 64', and the pulley support arms 56' and 58' are identical in construction and function to the lift cable 38, the pulleys 60, 62 and 64 and the pulley support arms 56 and 58 illustrated in FIG. 1 and described hereinabove in conjunction therewith.

A pair of rollers 98 are rotatably supported on a bracket 100 which is secured to the pivot arm 86. Upon pivotal movement of the lift bar 82, the pivot arm 86 operates through the rollers 98 to pivot one or the other of the pulley support arms 56' and 58'. This action separates the pulleys 60' and 62', thereby causing the lift cable 38' to raise selected weights from a weight stack against the action of gravity.

Figure 9:
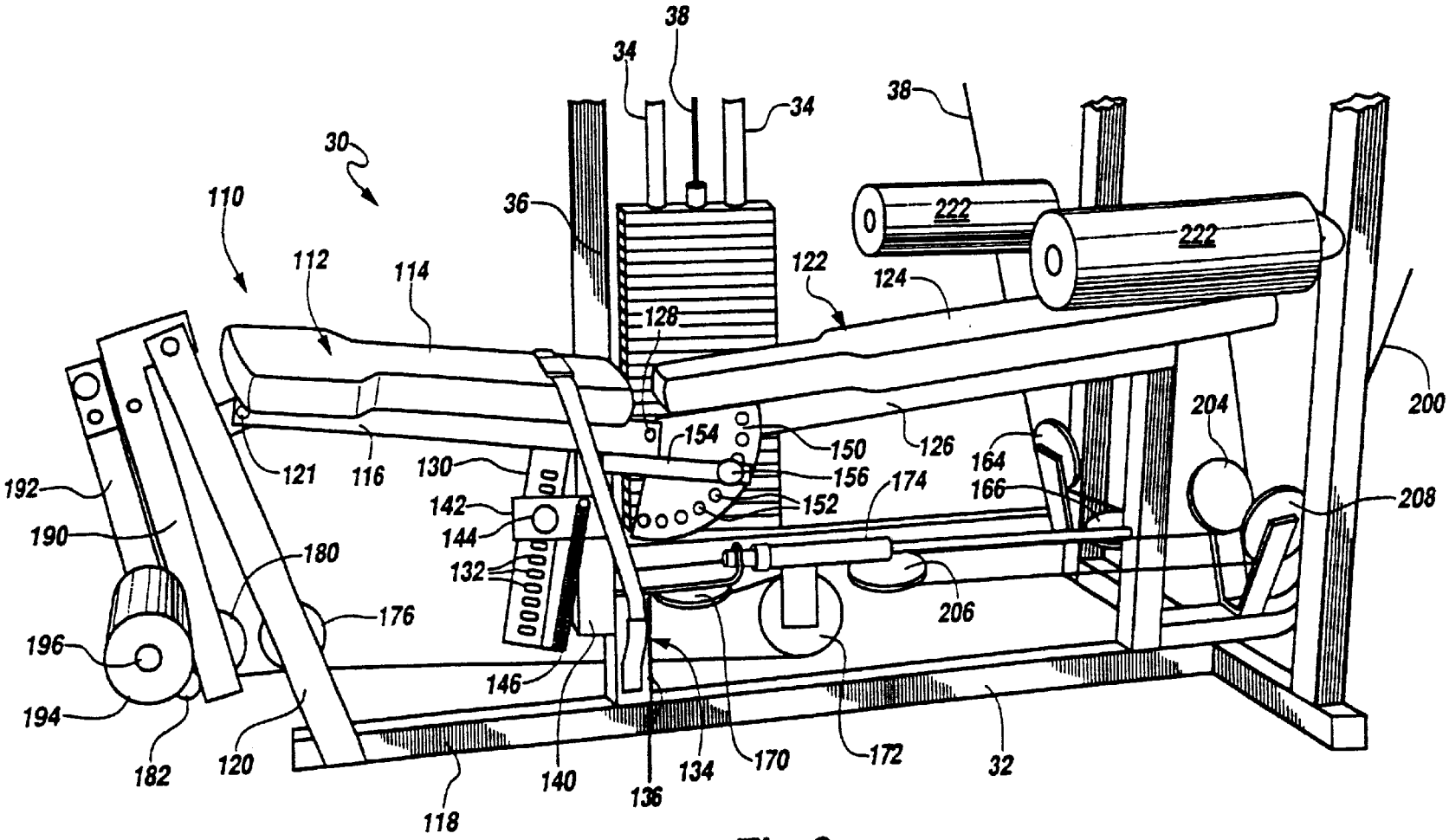
FIG. 9 is an enlargement of the lower portion of FIG. 2 showing the seat assembly of the weight lifting machine in a first configuration.

Referring now to FIG. 9, the compact weight lifting machine 30 further comprises a seat assembly 110. The seat assembly 110 includes a first section 112 comprising a pad 114 and a subframe 116. The frame 32 of the compact weight lifting machine 30 includes a horizontally disposed member 118 and an end member 120 extending generally upwardly therefrom. The subframe 116 of the seat assembly 110 is pivotally supported on the frame member 120 by a pin 121. The seat assembly 110 further comprises a second section 122 including a pad 124 mounted on a subframe 126. The subframe 126 is pivotally secured to the subframe 116 of the first section 112 by a pin 128.

The angular relationship between the first section 112 of the seat assembly 110 and the frame 32 of the compact weight lifting machine 30 is selectably adjustable. A bracket 130 is secured to and extends downwardly from the subframe 116. A plurality of pin receiving holes 132 are formed in the bracket 130. The frame 32 includes a vertically disposed portion 134 extending upwardly from the horizontally disposed portion 118, and comprising a first section 136 secured to the horizontally disposed portion 118 and a second section 140 secured to the first section 136.

A bracket 142 is secured to the second section 140. A locking pin 144 is mounted on the bracket 142 for engagement with the pin receiving holes 132 of the bracket 130. Thus, the locking pin 144 and the pin receiving holes 132 function to control the pivotal relationship between the first section 112 of the seat assembly 110 and the frame 32. A spring 146 is secured between the bracket 130 and the bracket 142 and functions to effectively counteract the action of gravity, whereby the positioning of the first section 112 relative to the frame 32 is more easily accomplished.

An arcuate member 150 is secured to the subframe 126 of the second section 122 of the seat assembly 110. The arcuate member is provided with a plurality of pin receiving holes 152 positioned at equally space intervals thereon. A bracket 154 is secured to the subframe 116 of the first section 112 of the seat assembly 110 and supports a locating pin 156. The locating pin 156 is selectively engaged with one of the pin receiving holes 152 of the arcuate member 150 to control the angular relationship between the first section 112 and the second section 122 of the seat assembly 110.

Figure 10:
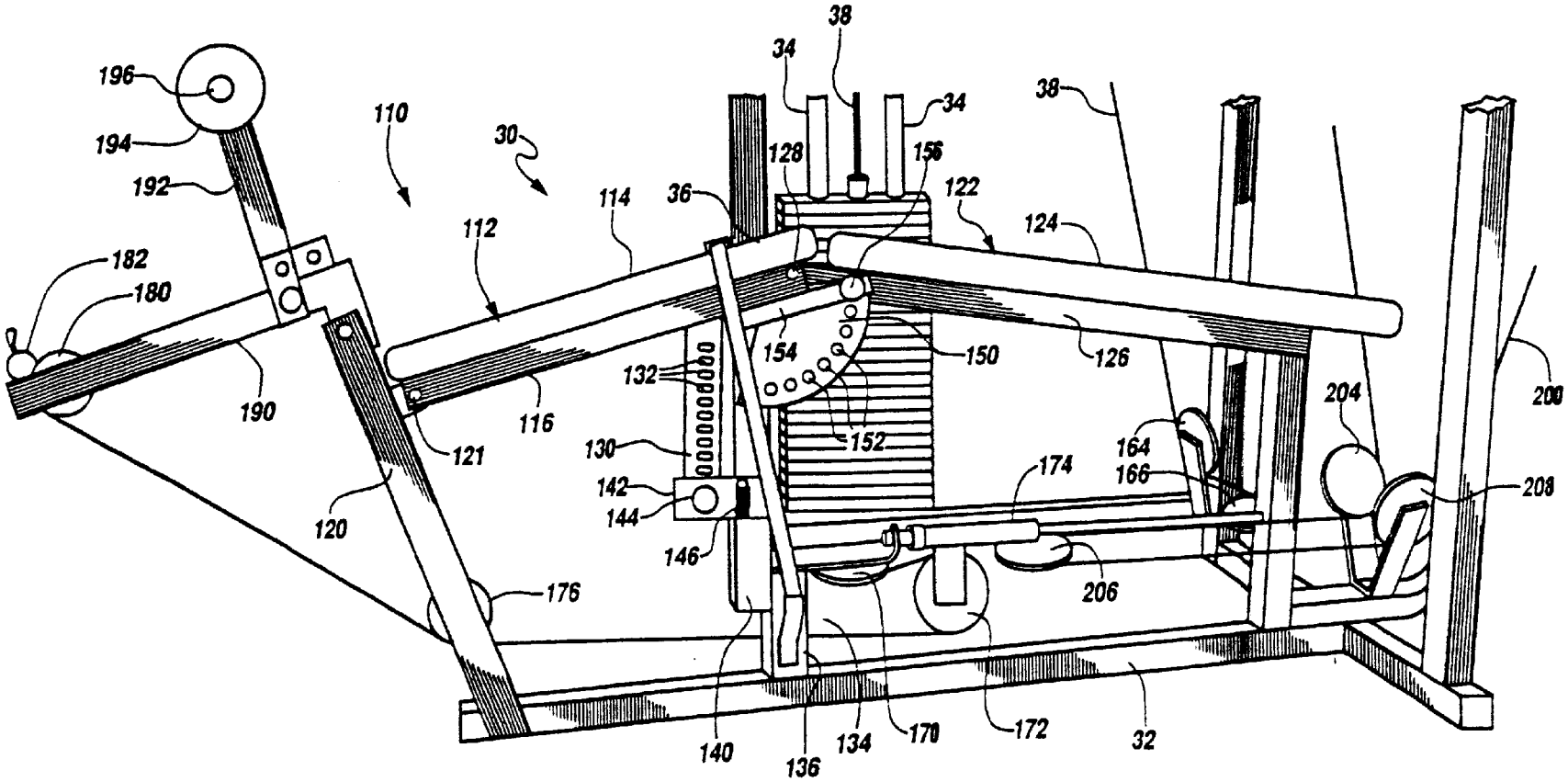
FIG. 10 is an illustration similar to FIG. 11 showing the seat assembly in a second configuration.

Referring now to FIGS. 9, 10, 11, 12, 13, and 14, the foregoing mechanism allows the selective positioning of the first section 112 and the second section 122 of the seat assembly 110 relative to the frame 32 of the compact weight lifting machine 30 to properly position and support the user to perform a wide variety of weight lifting exercises. For example, the positioning of the first section 112 and the second section 122 of the seat assembly 110 relative to the frame 32 as shown in FIG. 9 may be used to comfortably support the user to perform a variety of arm, chest and back exercises. The positioning of the first section 112 and the second section 122 relative to the frame 32 as shown in FIG. 10 comfortably supports the user to perform the exercise known as leg curls. Other positionings of the first section 112 and the second section 122 relative to the frame 32 of the compact weight lifting machine 30 are illustrated in FIGS. 11, 12, 13 and 14, it being understood that the configuration of the seat assembly 110 of the compact weight lifting machine 30 is not limited to those illustrated in the Drawing figures, but is capable of an almost infinite variety of configuration in accordance with the exercises being performed and the preference of the user.

Referring again to FIGS. 7, 9 and 10, the lift cable 38 extends downwardly from the pulley 64 and is trained around a series of pulleys 164, 166, and 170, all of which are rotatably supported on the frame 32. The lift cable 38 then extends around a pulley 172 rotatably supported on a slider 174. The cable 38 engages a pair of guide pulleys 176 and 180 and extends to a stop 182 and a ring 184. The ring 184 may be utilized to connect a variety of conventional weight lifting apparatus to the lift cable 38 to facilitate the performance of a variety of exercises utilizing the resistance afforded by the weights comprising the weight stack 36. The stop 182 serves as an anchor to activate operation of the lift bar assembly.

Referring to FIGS. 9 and 10, the pulley 176 is rotatably supported on the end member 120 of the frame 32, and the pulley 180 is rotatably supported on an arm 190. The arm 190 is pivotally supported on the upper end of the end member 120 and is selectively lockable either in the position shown in FIG. 9 or in the position shown in FIG. 10. An arm 192 is pivotally supported on the arm 190 and is in turn selectively lockable either in the position shown in FIG. 9 or in the position shown in FIG. 10. A pair of cylindrical pads 194 are mounted on opposite sides of the arm 192 and are supported on rods 196 extending in opposite directions from the distal end thereof.

Figure 11:
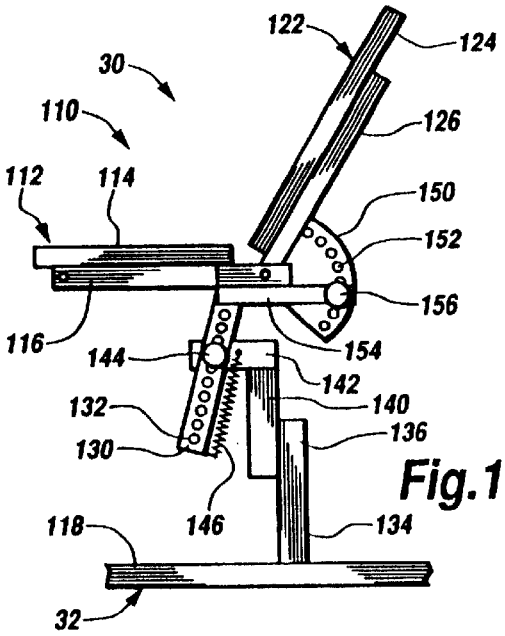
FIG. 11, FIG. 12, FIG. 13, AND FIG. 14 are diagrammatic illustrations of various configurations of the seat assembly of the weight lifting machine of FIG. 1.
Figure 12:
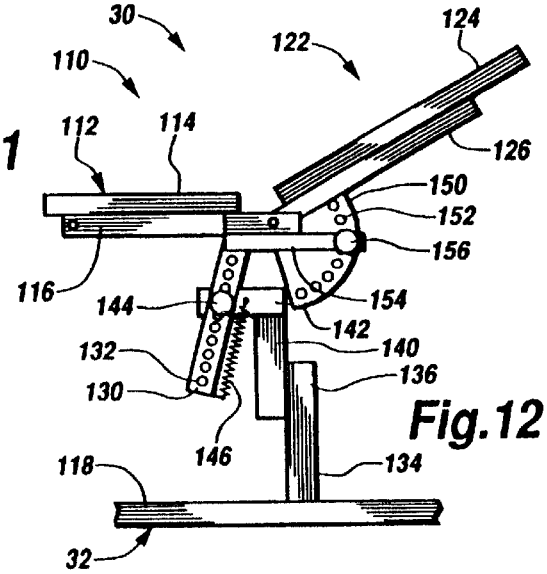
Figure 14:
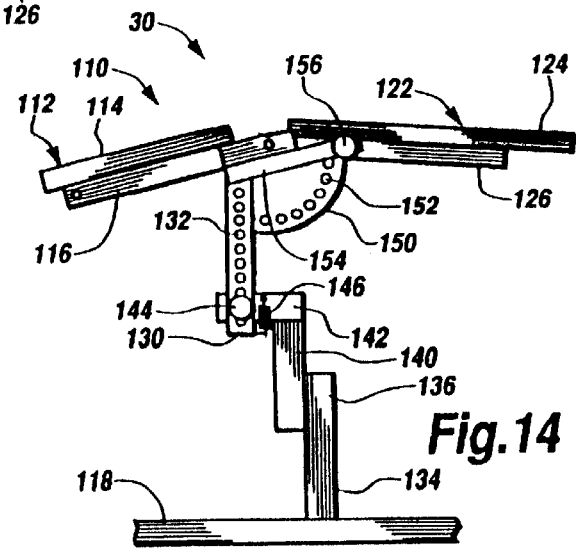
Figure 21:
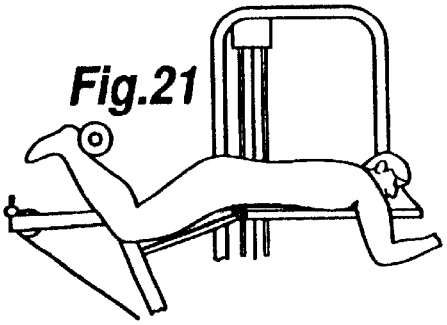
Figure 22:
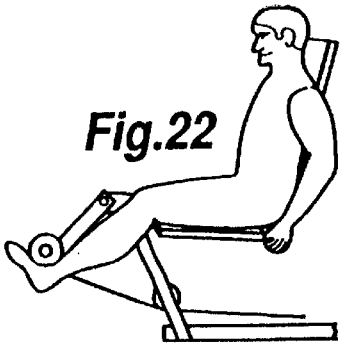

Referring to FIG. 9, 11, and 22, the positioning of the arm 190, the arm 192, and the pads 194 as illustrated in FIG. 9 and the positioning of the seat assembly 110 in the configuration illustrated in FIG. 11 adapts the compact weight lifting machine 30 for the performance of the exercise known as leg extensions. As is best shown in FIG. 10, 14, and 21, the positioning of the bar 190, the bar 192, and the pads 194 as illustrated in FIG. 10 and the positioning of the seat assembly 110 as illustrated in FIG. 14 adapts the compact weight lifting machine 30 for the performance of the exercise known as leg curls.

Figure 15:
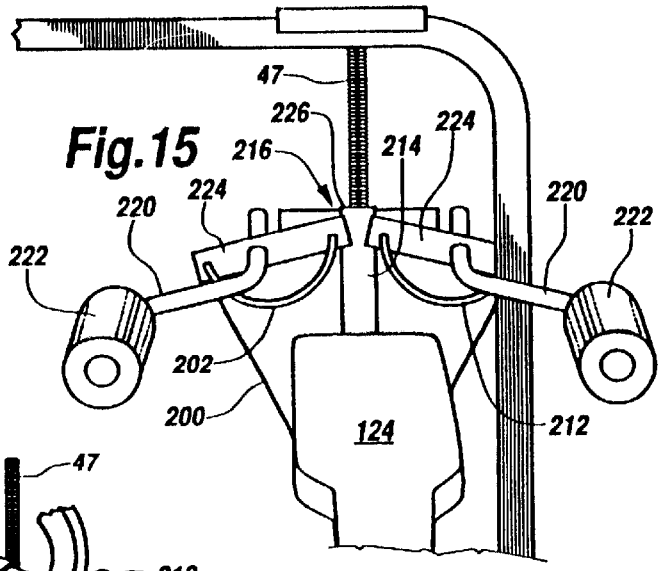
FIG. 15 is an illustration of certain other components of the weight lifting machine of FIG. 1.
Figure 16:
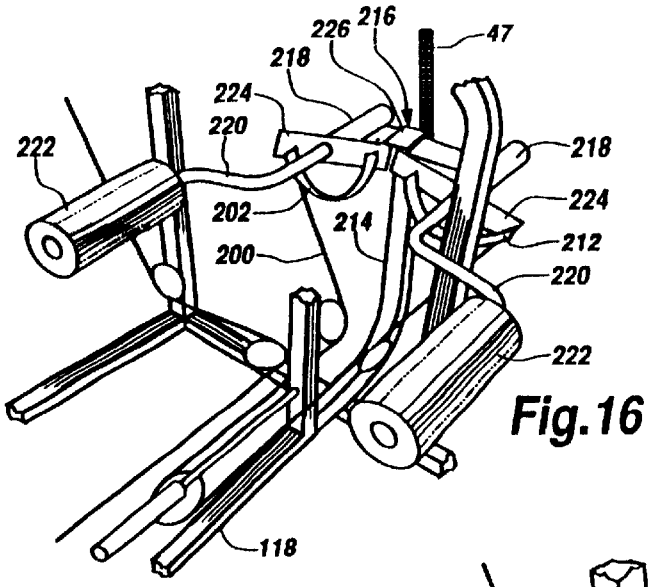
FIG. 16 is a perspective view of the mechanism of FIG. 8.
Figure 17:
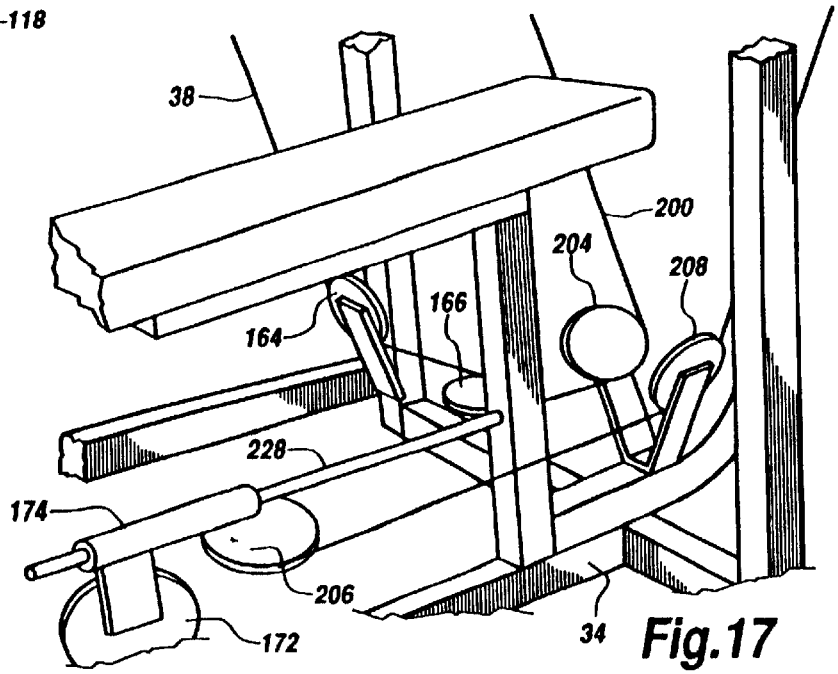
FIG. 17 is a further illustration of the lift cable assembly of the weight lifting machine of FIG. 1.
Figure 18:
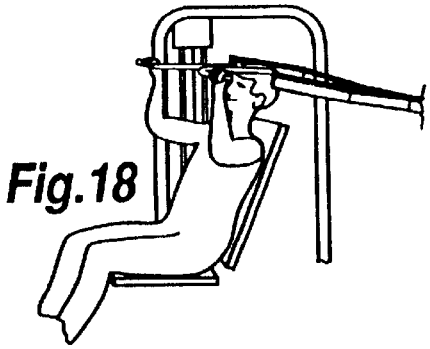
FIG. 18, FIG. 19, FIG. 20, FIG. 21, FIG. 22, and FIG. 23 are diagrammatic illustrations showing the use of the weight lifting machine of FIG. 1 to perform various exercises.
Figure 19:
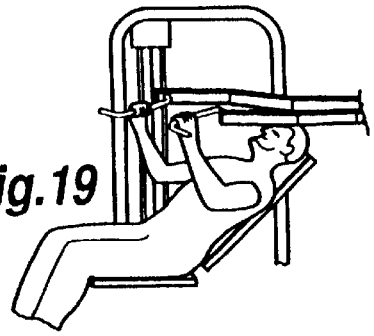
Figure 20:
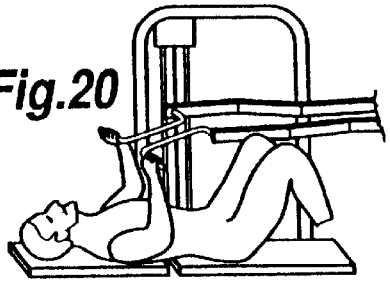

As is best shown in FIGS. 3, 15, 16, and 17, the compact weight lifting machine 30 further comprises a butterfly exercise mechanism located at the opposite end of the seat assembly 110 from the leg exercise mechanism comprising the arm 190, the arm 192, and the pads 194. Referring momentarily to FIGS. 7 and 17, the butterfly exercise mechanism includes a butterfly cable 200 which is secured at one end to an arcuate member 202. The cable 200 extends from the arcuate member 202 around a pulley 204 rotatably supported on the frame 32 and around a pulley 206 rotatably supported on the slider 174. From the pulley 206 the cable 200 extends around a pulley 208 rotatably supported on the frame 32 and is secured at its opposite end to an arcuate member 212 which is identical to but configured oppositely from the arcuate member 202.

Referring again to FIGS. 3, 15 and 16, the frame 32 includes an upwardly disposed member 214 located at one end of the horizontally disposed member 118. A subframe 216 is secured at the upper end of the upwardly disposed 214 and supports a pair of cylinders 218. The cylinders 218 pivotally support a pair of rods 220 having cylindrical pads 222 supported at the distal ends thereof.

The arcuate members 202 and 212 are mounted on plates 224 which are secured to the rods 220 for pivotal movement therewith. Downward pivotal movement of the pads 222 from the positions shown in FIGS. 15 and 16 is prevented by a stop 226 comprising part of the subframe 216. The stop 226 engages the plates 224 to properly position the pads 222 as shown.

Figure 13:
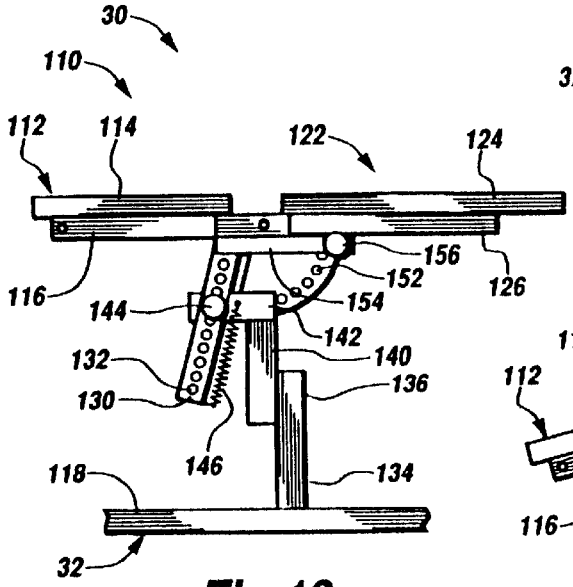
Figure 23:
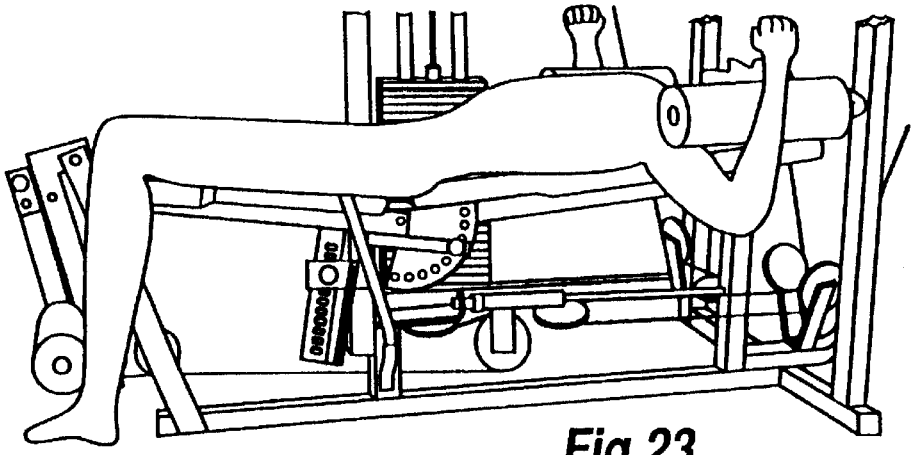

Referring to FIGS. 7, 15, 16 and 17, upward pivotal movement of the pads 222 under the action of a user causes the cable 200 to move the slider 174 rightwardly (FIGS. 7, 16, and 17). The slider 174 is mounted on a rod 228 comprising part of the frame 32. Upon actuation of the pads 222 the arcuate members 202 and 212 pull the cable 200 upwardly, whereupon the pulley 206 forces the slider 174 to move rightwardly. This action causes the pulley 172 rotatably supported on the slider 174 to actuate the lift cable 38 to raise selected weights comprising the weight stack 36, thereby affording resistance to movement of the pads 222 during the exercise known as the butterfly, FIGS. 13, 17, and 23 illustrate the configuration of the seat assembly 110 for the use of the compact exercising machine 30 in the performance of the butterfly exercise.

Although preferred embodiments of the invention have been illustrated in the accompanying Drawings and described in the foregoing Detailed Description, it will be understood that the invention is not limited to the embodiments disclosed, but is cable of numerous rearrangements, modifications, and variations of parts and elements thereof in accordance with the spirit of the invention.

I claim:

1. A compact weight lifting machine comprising:

a lift bar having at least one handle;

means for supporting the lift bar for movement in first and second opposite directions;

a pivot arm;

means connecting the pivot arm to the lift bar for movement therewith;

means for selectively varying the positioning of at least the handle of the lift bar relative to the pivot arm;

first and second pulleys mounted on opposite sides of the pivot arm, respectively;

means for moving the first pulley in the first direction with the pivot arm when the lift bar is moved in the first direction;

means for limiting movement of the second pulley in the first direction when the first pulley is moved in the first direction;

means for moving the second pulley in the second direction when the lift bar is moved in the second direction;

means for limiting movement of the first pulley in the second direction when the second pulley is moved in the second direction;

a continuous cable trained around the first and second pulleys;

means for securing one end of the cable against movement; and resistance means connected to the other end of the cable for resisting movement of the lift bar.

2. The compact weight lifting machine according to claim 1 further comprising:

a seat [assembling] *assembly* positioned beneath the lift bar and including interconnected first and second sections; and means for selectively securing the first and second sections of the seat assembly in a variety of angular relationships to comfortably support a user while engaging the lift bar.

3. The compact weight lifting machine according to claim 2 further comprising an auxiliary lift mechanism located at one end of the seat assembly and connected to the cable for actuation by the legs of the user in both seated and prone positions on the seat assembly.

4. The compact weight lifting machine according to claim 3 further comprising a second auxiliary lift mechanism located at the other end of the seat assembly and adopted for actuation by the arms of the user while in a reclining position on the seat assembly.

*5. In an exercise machine of the type in which at least one weight is lifted in response to a predetermined movement, the improvement comprising:*

*a lift bar supported for pivotal movement about a horizontal axis in first and second directions from an initial position;*

*a first lever supported for pivotal movement in the first and second directions;*

*a first pulley rotatably supported on the first lever;*

*means for moving the first lever and the first pulley in the first direction when the lift bar is moved in the first direction;*

*a second lever supported for pivotal movement with the lift bar in the first and second directions;*

*a second pulley rotatably supported on the second lever;*

*means for moving the second pulley in the second direction when the lift bar is moved in the second direction;*

*means for limiting movement of the first pulley in the second direction when the second pulley is moved in the second direction; and*

*a cable connected to the at least one weight and passing around the first and second pulley to a fixed restraint.*

*6. The compact weight lifting machine according to claim 5 and further comprising:*

*a seat assembly having first and second sections positioned beneath the lift bar and including means for selectively interconnecting the first and second sections; and*

*means for selectively securing the first and second sections of the seat assembly in a variety of angular relationships to comfortably support a user engaging the lift bar.*

* * * * *